United States Patent [19]

Usuda

[11] Patent Number: 4,661,899
[45] Date of Patent: Apr. 28, 1987

[54] NUMERICAL CONTROL SYSTEM
[75] Inventor: Eiji Usuda, Fussa, Japan
[73] Assignee: Fanuc Ltd, Minamitsuru, Japan
[21] Appl. No.: 744,007
[22] PCT Filed: Sep. 25, 1984
[86] PCT No.: PCT/JP84/00458
 § 371 Date: May 13, 1985
 § 102(e) Date: May 13, 1985
[87] PCT Pub. No.: WO83/01595
 PCT Pub. Date: Apr. 11, 1985
[30] Foreign Application Priority Data
 Sep. 27, 1983 [JP] Japan .............................. 58-177043
[51] Int. Cl.[4] ........................................... G06F 15/46
[52] U.S. Cl. .................... 364/171; 364/188; 364/474
[58] Field of Search .............................. 364/167–171, 364/474, 475, 188, 189, 191–193

[56] References Cited
U.S. PATENT DOCUMENTS
4,445,182 4/1984 Morita et al. ................... 364/171 X
4,524,414 6/1985 Kiyokawa .......................... 364/171
4,591,989 5/1986 Tanaka ............................ 364/171 X Primary Examiner—Joseph Ruggiero
Attorney, Agent, or Firm—Staas & Halsey

[57] ABSTRACT

A numerical control system includes an information input-output circuit (3), a processing unit (1), a display (4) and a memory (2). The information input-output circuit (3) has an input (31) for the address numbers of the information elements to be displayed, an input (32) for the time scale with which the display is presented, an input (33) for the address number of a trigger information element, an input (34) for a command for selection of a repetitive picture or a set of non-repetitive pictures, and an input (35) for a delay time, if any. The processing unit (1) has a input (11) for selecting address numbers of the information elements to be displayed, an input (12) for selecting the time scale with which the display is presented, an input (13) for selecting the address number of a trigger information element, an input (14) for conducting a command for selecting a repetitive picture or a set of non-repetitive pictures, and an input (15) for selecting a delay time. The display (4) has a display (41) for the address numbers of the information elements to be displayed, a graphic display (42) for displaying the sequential progress or operational positions of the information elements, and a display (43) for the display conditions.

2 Claims, 7 Drawing Figures

NUMERICAL CONTROL SYSTEM

BACKGROUND OF THE INVENTION

This invention relates to a numerical control system employable for controlling machine tools and the like. More specifically, this invention relates to a numerical control system having a function of graphically displaying the sequential progress or operational positions of any of the control elements controlled by the numerical control system, in an arbitrarily selected manner in terms of e.g. display format, time scale (which is defined as a length of time to be represented by a unit geometrical length of a display), display starting time, or the like.

The essential components of a numerical control system are a central processing unit, a memory means and an input-output means. Although a display means is not necessarily included in the essential components of a numerical control system, the display means is extremely convenient for finding various errors caused by user operations and/or various errors relating to the items of user operations e.g. program errors, control errors, etc. and/or for finding malfunctions in the numerical control system proper. Further, the display means is useful for monitoring the sequential progress of machining conducted by a machine tool controlled by a numerical control system. Since a display means is thus a significant benefit for a numerical control system, a numerical control system is usually equipped with a display means. Particularly, the items relating to user operations are preferably displayed.

In addition, a programmable controller is preferably employed as the sequential control unit of a power panel which functions as the interface connecting a numerical control system and a machine tool controlled therewith, because it is convenient for compiling and testing a program (e.g. a sequential control program or the like). A programmable controller is defined as an additional computer including a processing unit, a memory means, and an input-output means in some cases, for supplementing the function of a main computer which the programmable controller is attached to. The programmable controller receives inputs of various information including the information which a user inputs in an input-output means of the numerical control system, the information picked up by sensors attached to a machine tool controlled by the numerical control system, and the information input by the numerical control system. The information input to this programmable controller is processed under the control of the program of the programmable controller, before the results of the processing are input to the numerical control system and/or the machine tool. In other words, a programmable controller is a supplemental computer having an individual specification and being designed and installed independently of a numerical control system which is inclined to have a fixed or non-flexible specification due to the potential advantage of mass production. The programmable controller applies preparatory processes to the information predominantly relating to user's operations and inputs the results of the preparatory processes to a numerical control system and/or a machine tool. Accordingly, a means for displaying the information inputted and/or outputted by a programmable controller, provides considerable advantages. This invention relates to an improvement applicable to a display means which is attached to a numerical control system including a programmable controller.

In the prior art, a numerical control system having a programmable controller and a display means, uses numerals as media for displaying control elements. However, since such a display, presented in the form of numerals, is arranged in the format of a program list, it is generally difficult to display the sequential progress or operational positions of plural control elements which relate to one another in one picture. Thus, it is clear that a display means having the functions itemized below would be extremely useful from the industrial viewpoint:

i. a function of graphically displaying, in one picture displayed with a time scale (which is defined as a length of time to be represented by a unit geometrical length of a display) most convenient to observe, a group of information elements each of which resides remote from the other in a program but which relate to each other from a functional viewpoint, the information elements being selected from plural addresses remote from one another;

ii. a function of displaying the above information elements not only as a one-shot type still picture but also as a set of repetitive pictures, which is defined as a set of plural pictures cyclically appearing on a screen to represent the operational positions of the same set of control elements at a different time range, such a cyclical display being triggered by cyclical generation of a trigger signal; and iii. a function of displaying a sequential progress or operational positions of the above set of information elements which occurs some time later than the time at which a display command is issued, in a specific environment in which such a delayed display is convenient for some reason relating to the function of a machine tool with which the numerical control system is employed.

SUMMARY OF THE INVENTION

It is an object of this invention to provide a numerical control system having a display means having the functions itemized below:

i. a function of allowing arbitrary selection of plural control elements which relate to one another and to graphically display the same in one picture with a time scale (which is defined as a length of time to be represented by a unit geometrical length of a display) most convenient to observe;

ii. a function of displaying the plural control elements as a one-shot type still picture or as a set of repetitive pictures, which is defind as a set of plural pictures cyclically appearing on a screen to represent the operational positions of the same set of control elements at a different time range, such a cyclical display being triggered by cyclical generation of a trigger signal.

iii. a function of delaying the commencement of the display for specific period, in a specific environment where such a delay is preferable for some reason related to the machine tool, so that the display of functional positions commences at a specific time later than the time at which the corresponding trigger signal is generated.

To achieve the foregoing object of this invention, the input-output means, the processing unit and the display means of a numerical control system provided with a programmable controller in accordance with this invention, are as described below:

i. The input-output means is provided with (a) a means for inputting the address numbers of a plurality of information elements to be displayed, (b) a means for inputting a time scale (which is defined as a length of time to be represented by a unit geometrical length of a display) with which a display is presented, (c) a means for inputting the address number of a display trigger information element, (d) a means for inputting a command for selection of either a set of repetitive pictures or a one-shot type picture, and (e) a means for inputting the delay time for which the commencement of display is delayed after the corresponding trigger signal is generated.

ii. The processing means is provided with (a) a means for selecting the address numbers of the plurality of information elements to be displayed, (b) a means for selecting the time scale (which is defined as a length of time to be represented by a unit geometrical length of a display) with which a display is presented, (c) a means for selecting the address number of a display trigger information element, (d) a means for conducting the command for selection of either repetitive display or one-shot display, and (e) a means for selecting the delay time for which the commencement of the display is delayed after the corresponding trigger signal is generated.

iii. The display means is provided with (a) an area in which the address numbers of a plurality of information elements are displayed, (b) an area in which the sequential progress or operational positions of the plurality of information elements are graphically displayed, and (c) an area in which the display conditions are displayed.

As a result, the aforementioned information elements are graphically displayed, based on the conditions determined by the aforementioned processing unit.

BRIEF DESCRIPTION OF THE DRAWINGS

A detailed description will be presented below for a numerical control system in accordance with an embodiment of this invention, referring to the drawings itemized below.

DETAILED DESCRIPTION OF THE PREFERRED EMBODIMENT

Figure 1:
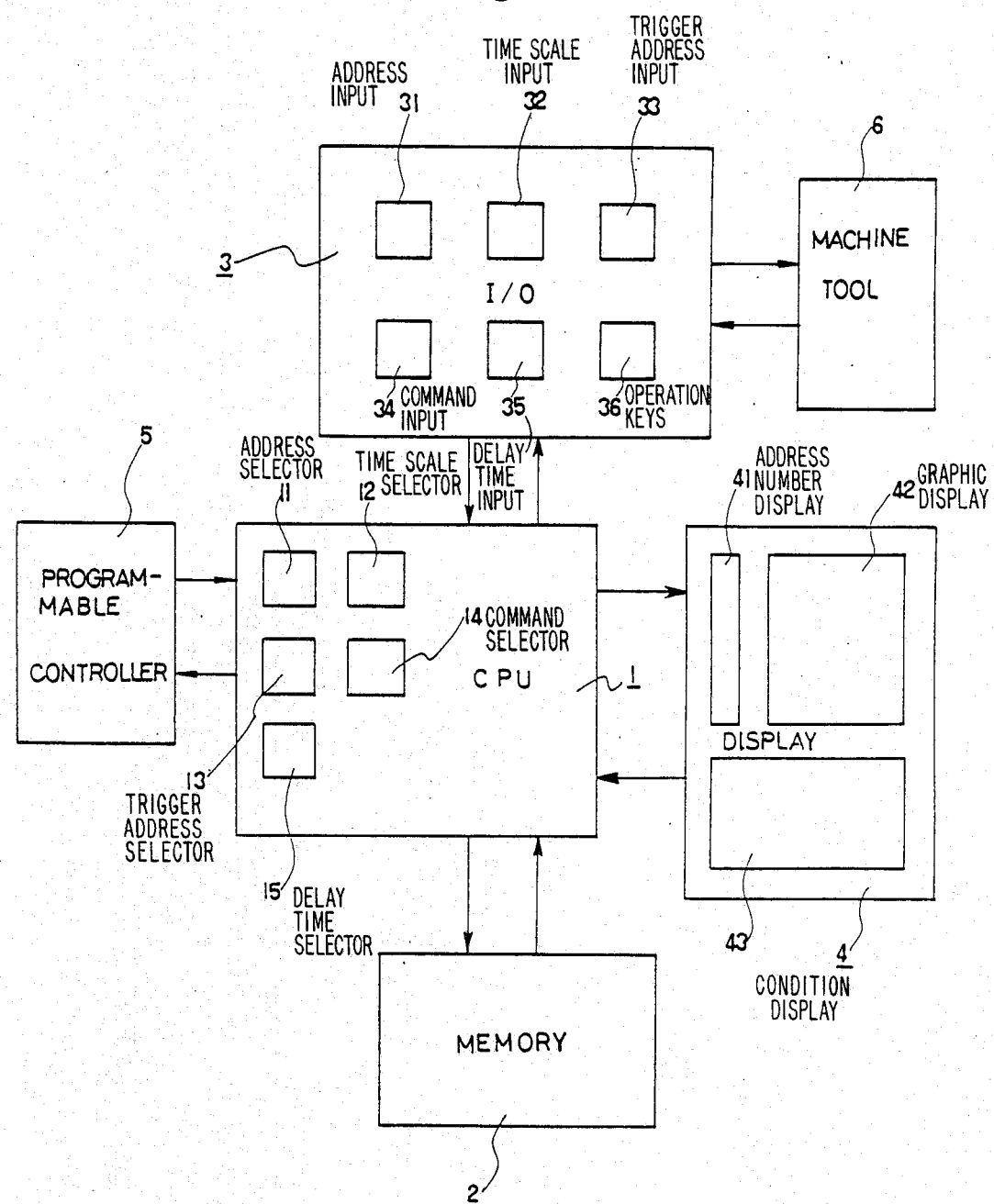
FIG. 1 is a block diagram of the components of a numerical control system in accordance with an embodiment of this invention.

FIG. 1 is a block diagram of a numerical control system in accordance with this invention. An information input-output means 3 is provided with a plurality of inputs including (a) a means 31 for inputting the address numbers of a plurality of information elements to be displayed, (b) a means 32 for inputting the time scale (which is defined as a length of time to be represented by a unit geometrical length of a display) with which a display is presented, (c) a means 33 for inputting the address number of a display trigger information element, (d) a means 34 for inputting a command for selection of either a set of repetitive pictures or a one-shot type picture, and (e) a means 35 for inputting the delay time by which the commencement of display is delayed after the corresponding trigger signal is generated. These inputs are provided in addition to the ordinary input means 36 (e.g., operation keys). A programmable controller 5 is a compact computer provided with a processing unit and a memory means and is loaded with a program of its own. The programmable controller 5 performs calculations based on its own program, for any of the information, including the information inputted by the input-output means 3, the signals detected by the machine tool 6 to be controlled by the numerical control system, and the signals given by the processing unit 1, before it outputs the results of the calculation toward the machine tool 6 and the processing unit 1. In addition, the programable controller 5 has functions for compiling, testing, and the like of the programs for sequence control etc. The processing unit 1 is provided with (a) a means 11 for selecting the address numbers of a plurality of information elements to be displayed, (b) a means 12 for selecting the time scale (which is defined as a length of time to be represented by a unit geometrical length of a display) with which a display is presented, (c) a means 13 for selecting the address number of a display trigger information element, (d) a means 14 for conducting a command for selection of either repetitive display or one-shot type display, and (e) a means 15 for selecting the delay time by which the commencement of display is delayed after the corresponding trigger signal is generated. The picture frame or screen of a display means 4 is provided with plural displays, including (a) an area 41 in which the address numbers of a plurality of information elements to be displayed, are displayed, (b) an area 42 in which the sequential progress or operational positions of the information elements are graphically displayed, and (c) an area 43 in which the display conditions are displayed, so that each of the aforementioned display elements is displayed in each display area described above. As a result, the numerical control system in accordance with the present invention includes a display means having the functions itemized below:

i. a function of graphically displaying, in one picture with a time scale (which is defined as a length of time to be represented by a unit geometrical length of a display) most convenient to observe, a group of information elements each of which resides remote from the others in a program but which relates to the others from a functional viewpoint, after being selected from plural addresses remote from one another;

ii. a function of displaying the above information elements not only as a one-shot type still picture but also as a set of repetitive pictures, which is defined as a set of plural pictures cyclically appearing on a screen to represent the operational positions of the same control elements at a different time range, such a cyclical display being triggered by cyclical generation of a trigger signal;

iii. a function of displaying a sequential progress or operational positions of the above information elements which occur some time later than the time at which a display command or trigger signal is generated, in a specific environment in which such delayed display is convenient for some reason relating to the function of the machine tool with which the numerical control system is employed.

Figure 2:
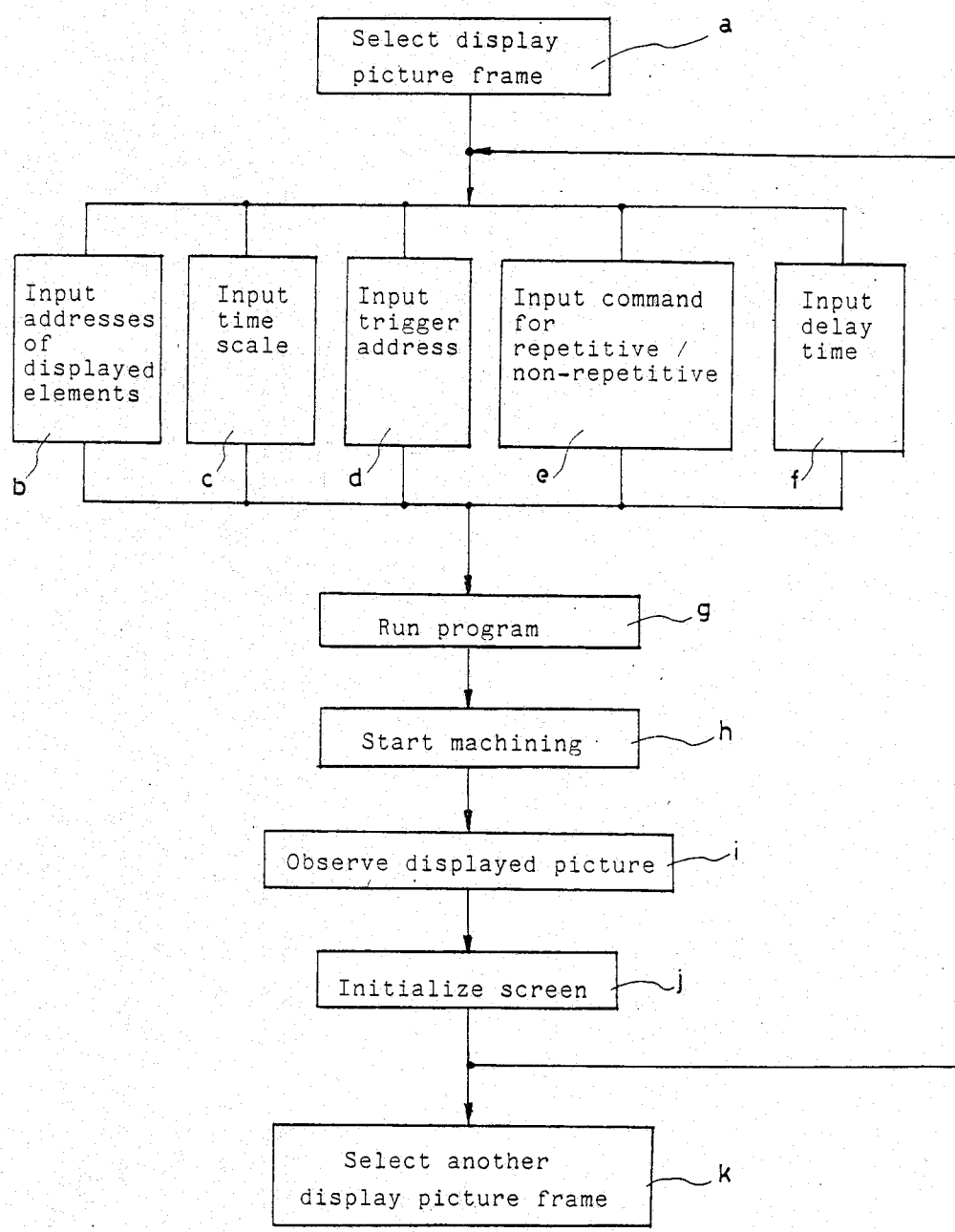
FIG. 2 is a flow chart for the overall operating procedure of a numerical control system in accordance with the embodiment of FIG. 1.
Figure 3A:
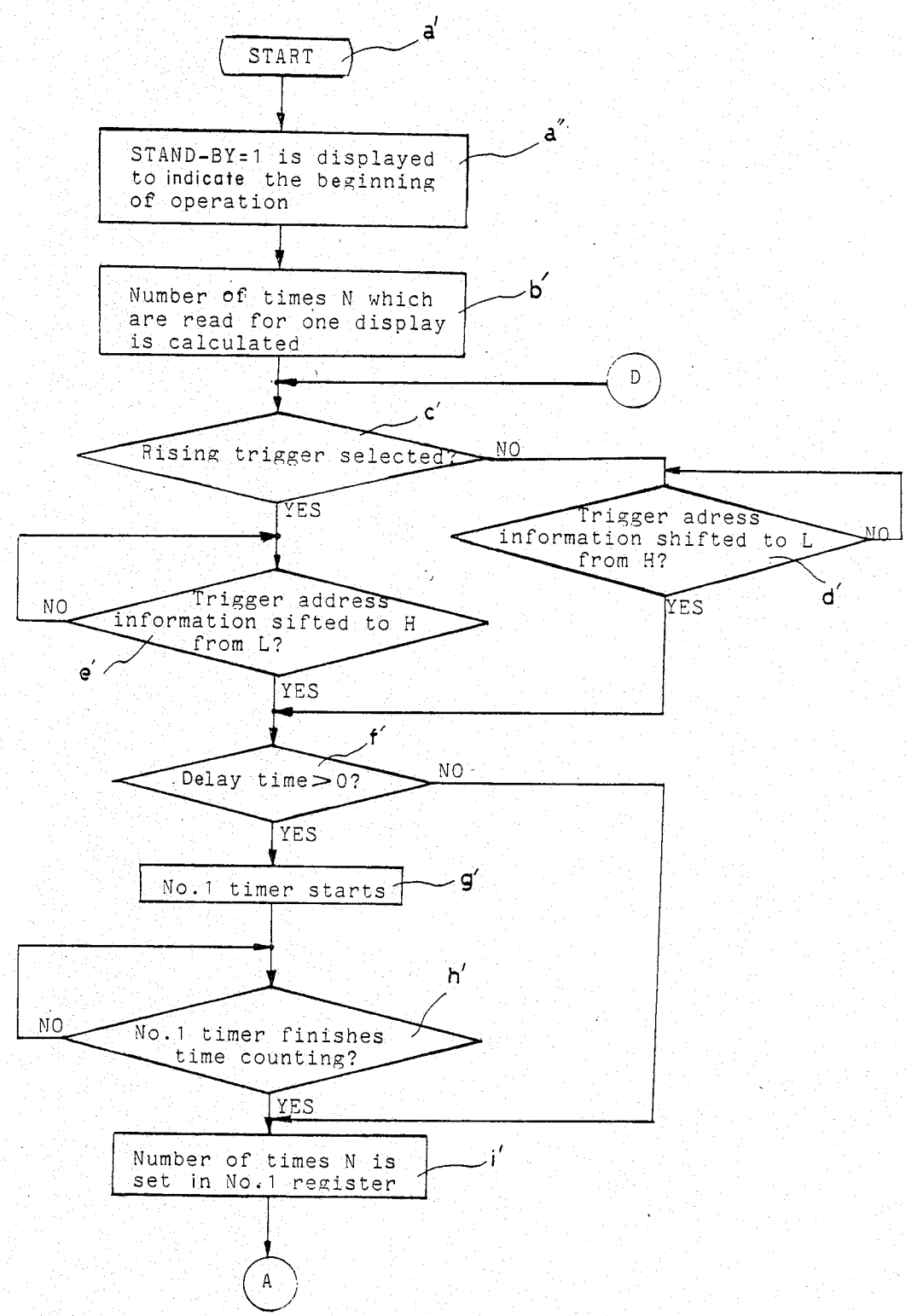
FIGS. 3A, 3B, 3C and 3D form a flow chart for the functional processing operation of a numerical control system in accordance with the embodiment of FIG. 1.
Figure 3B:
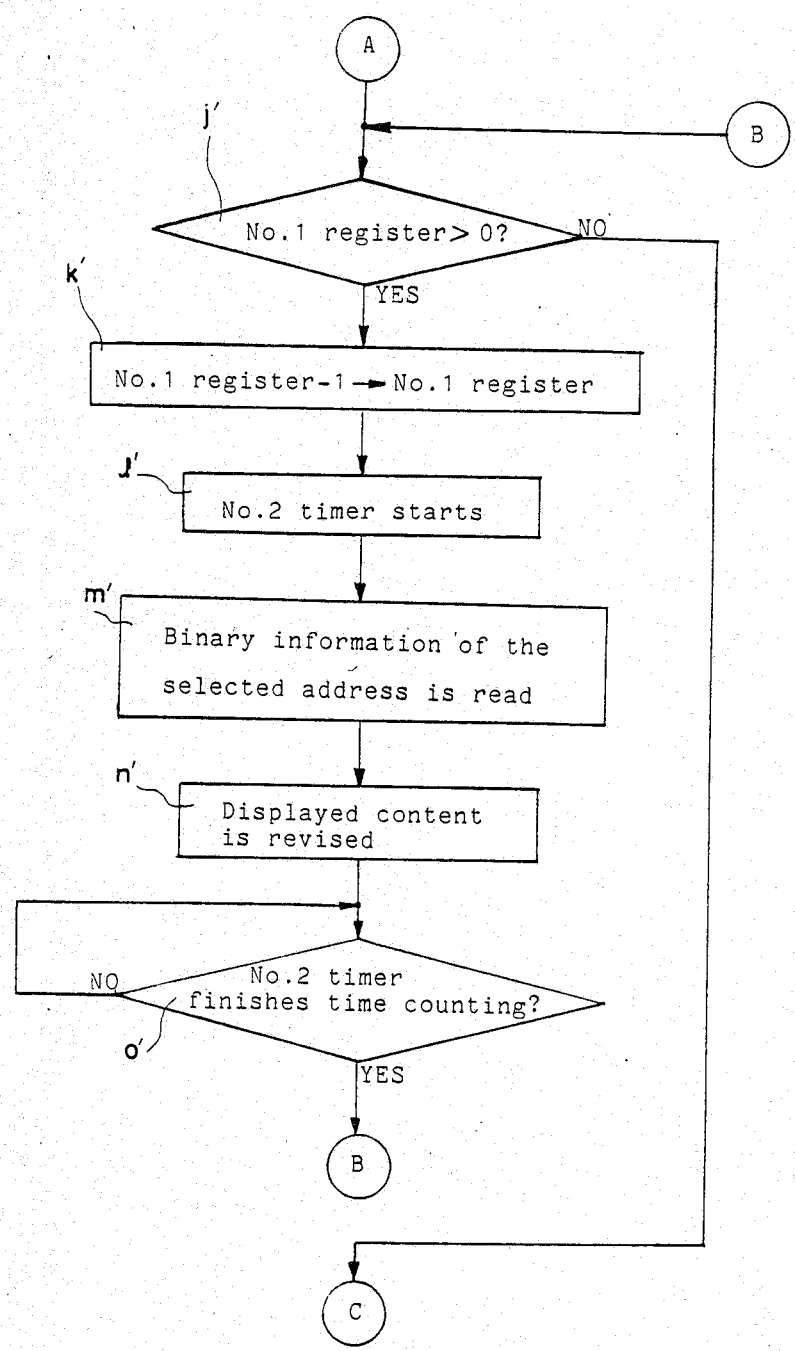
Figure 3C:
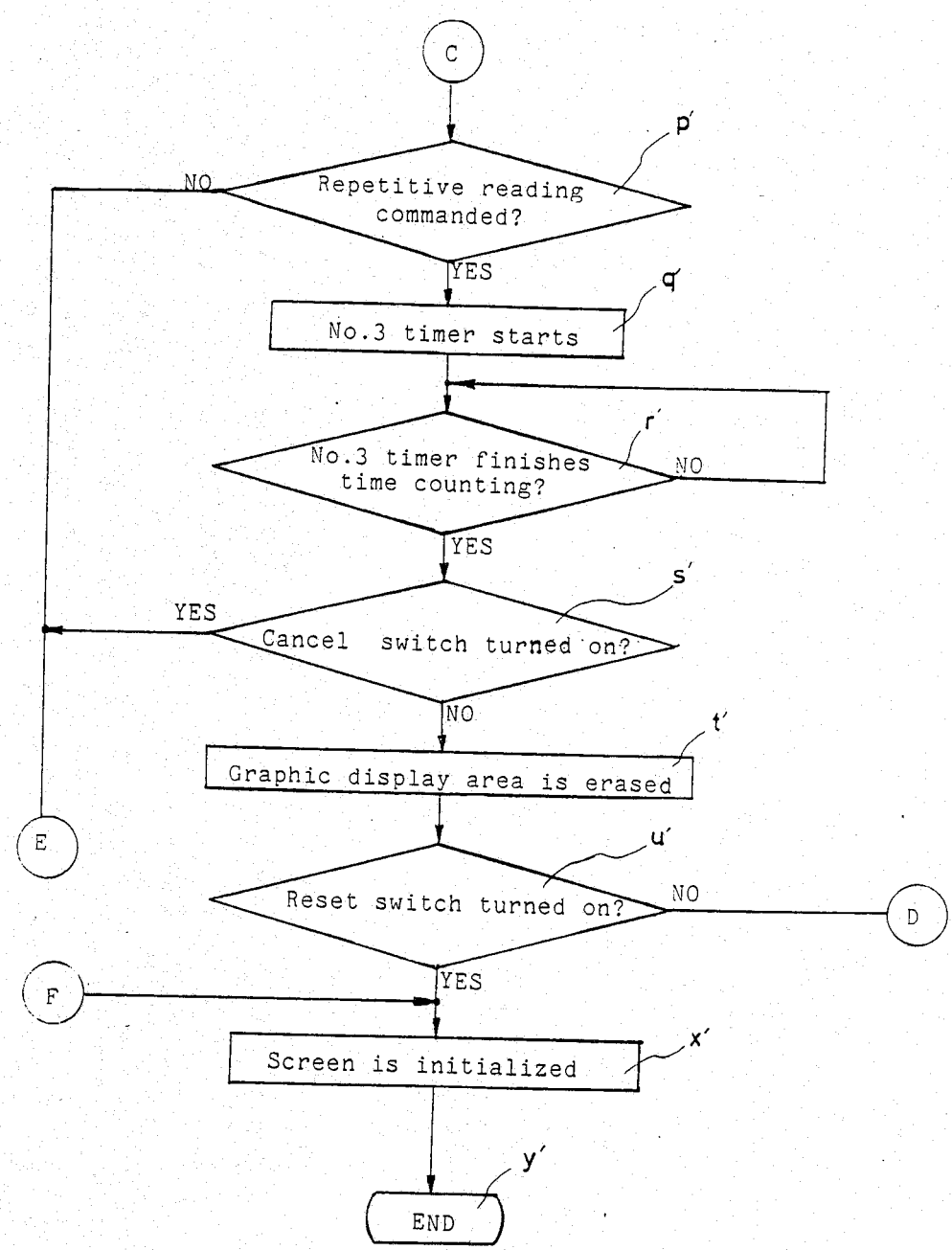
Figure 3D:
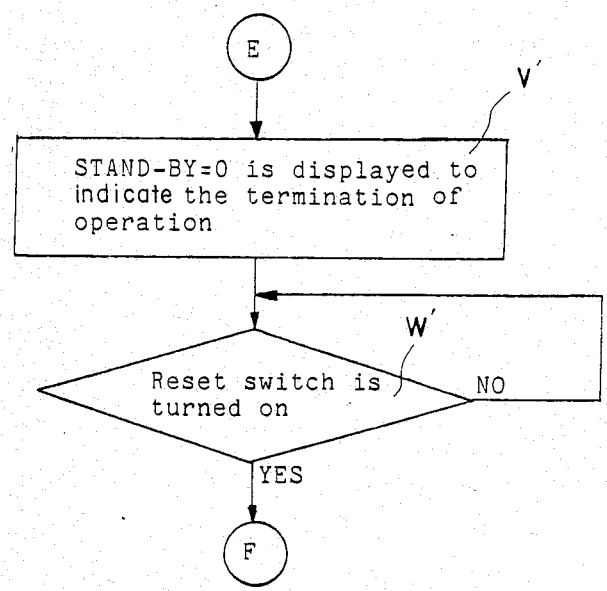

Referring to FIG. 2 (a flow chart illustrating the overall operating procedure), the operating procedure of a numerical control system in accordance with the embodiment of FIG. 1, will be described below.

First, a display picture frame selection switch is turned on to select a display picture frame (a).

Second, the address numbers of all the information elements which are desired to be displayed, are inputted (b). The maximum quantity of information elements which can be simultaneously displayed is determined by the dimension of the display means.

Third, the time scale (which is defined as a length of time to be represented by a unit geometrical length of a display) is inputted (c). The time scale is intended to mean a time-wise scale or unit following which the time-wise dimension of a display is determined. In other words, the time scale is intended to mean the length of time corresponding to the geometrical length of the intervals left among the marks shown at the top line in FIG. 4.

Fourth, the address number of an information element which is selected as a trigger element, is inputted. The trigger element can be selected out of all the control elements available (d).

Fifth, a command for selecting either a set of repetitive pictures or a one-shot type picture, is inputted (e). If the former is selected, a picture cyclically appears for a set of information elements, whenever the selected trigger signal is cyclically generated following the programmed sequence. In contrast, if the latter is selected, a picture appears representing the operational positions corresponding to the time at which a trigger signal is generated.

Sixth, a delay time, if any, to be left between the generation of the trigger signal and the commencement of the display, is inputted (f).

Any of the aforementioned six steps is allowed to be skipped, if the step is unnecessary.

A start switch is turned on to start the processing unit 1 (g).

A machine tool starts machining (h).

A picture appears on the screen to allow an operator to observe the same (i).

A reset switch is turned on to initialize the screen (j).

A display picture frame selection switch is turned on again to select another display picture frame (k).

Referring to FIGS. 3A–3D (a flow chart illustrating the functional operation), the functional operation of the numerical control system in accordance with the present invention will be described below.

Figure 4:
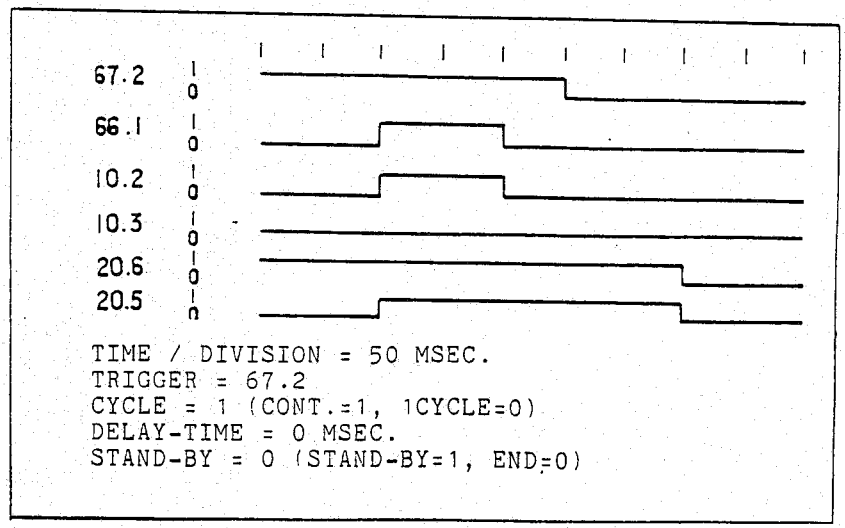
FIG. 4 is an example of a picture appearing on the screen of the display means of a numerical control system in accordance with the embodiment of FIG. 1.

Immediately after the program starts running (a'), "STAND-BY=1" is displayed (a") to indicate the commencement of operation. The processing unit 1 calculates the number of times N for which the reading is conducted for one display (b'). The calculation is conducted, following a formula:

$$N = \frac{S \cdot D}{T}$$

where,
N is the number of times for reading binary information,
S is the number of intervals left among the marks made along the transverse axis of a display (See FIG. 4),
T is the period (mS) for reading the binary information,
D is the time scale (which is defined as a length of time to be represented by a unit geometrical length of a display) shown in terms of milli seconds (See FIG. 4).

An examination is conducted to determine whether or not a rising trigger is selected (c'). If it is not selected, the progress is paused until the trigger address information shifts to an L level from a H level (d'). If a rising trigger is selected, the progress is paused until the trigger address information shifts to a H level from an L level (e'). In other words, if a rising trigger is selected, the progress proceeds, provided the trigger address information shifts from an L level to a H level, and if a rising trigger is not selected, the progress proceeds, provided the trigger address information shifts from a H level to an L level.

An examination is conducted to determine whether or not a delay time is larger than "0 (zero) second" (f'). If delay time is inputted and it is larger than "0 (zero) second", a No. 1 timer which is to set the period between the commencement of a trigger and the commencement of reading binary information, starts the time counting operation (g'). The timer is set by means of an input means of the delay time for reading. The progress is paused until the No. 1 timer finishes the time counting operation (h'). In contrast, if no delay time is inputted, this step is skipped.

The number of times N calculated in the b' step is set in a No. 1 register, which is a register in which the number of times representing the difference between the number of times for reading binary information and the number of times representing the number of times which have already been read (i').

An examination is conducted to determine whether the content of the No. 1 register is zero or not (j'). If it is larger than "0 (zero)", the content of the No. 1 register is subtracted by "1" (k').

A No. 2 timer (a timer which determines the period remaining for reading binary information and of which the set time is fixed in the processing unit 1) starts the time counting operation (l').

The binary information of the selected address is read (m'), and the displayed content is revised (n').

The progress is paused until the No. 2 timer finishes the time counting operation (o'). Provided the No. 2 timer finishes the time counting operation, the progress returns to the j' step.

If the No. 1 register is not larger than "0 (zero)" (j'), an examination is conducted to determine whether a repetitive reading is commanded or not (p'). If a repetitive reading is commanded, a No. 3 timer (a timer which determines the duration of a period for which a position representing the termination of a display is kept and for which the set time is fixed in the processing unit 1) starts the time counting operation (q').

The progress pauses until the No. 3 timer finishes the time counting operation (r'). Provided the No. 3 timer finishes the time counting operation, an examination is conducted to determine whether a cancel switch is turned on or not (s'). If the cancel switch is not turned on, the area for a graphic display is erased (t'). This cancel switch releases the command for continuous reading too.

An examination is conducted to determine whether a reset switch is turned on or not (u'). If the reset switch is not turned on, the progress returns to the c' step.

If a repetitive reading is not commanded (p'), or if a cancel switch is turned on (s'), "STAND-BY=0" is displayed to indicate completion of the operation (v').

The progress is paused until a reset switch is turned on (w').

If the reset switch is turned on (u' or w'), the screen is initialized (x') and the program terminates (y').

An example of a picture appearing on the screen of the display means 4 is illustrated in FIG. 4. Referring to FIG. 4, the displayed information is as follows:

i. The address numbers of the information elements to be displayed are 67.2, 66.1, 10.2, 10.3, 20.6 and 20.5.

ii. The time scale (which is defined as a length of time to be represented by a unit geometrical length of a display) with which a display is presented, is 50 mS.

iii. The address number of the display trigger information element is 67.2.

iv. Non-repetitive display (one-shot type display) is commanded.

v. No delay is commanded for commencement of display. In other words, immediately after a trigger information element (The address number thereof in this example is 67.2) is generated, a picture appears.

vi. The present sequential position is "STAND-BY=0", representing the position wherein the numerical control system is not in an alert position.

The area 41 displays the address numbers of the information elements to be displayed and the identification of levels (H or L) for the graphic display showing the sequential progress or operational positions of the aforementioned information elements which are displayed in the area 42. The area 43 displays the display conditions.

The foregoing description clearly shows that successfully provided in accordance with this invention is a numerical control system having a display means having the functions itemized below:

i. a function of graphically displaying, in one picture to be displayed with a time scale (which is defined as a length of time to be represented by a unit geometrical length of a display) most convenient to observe, a group of information elements each of which resides remote from the others in a program but which relates to the others from a functional viewpoint, after being selected from plural addresses remote from one another;

ii. a function of displaying the above information elements not only as a one-shot type still picture but also as a set of repetitive pictures, which is defined as plural pictures cyclically appearing on a screen to represent the operational positions of the same control elements at a different time range triggered by cyclical generation of a trigger signal; and iii. a function of displaying the sequential progress or operational positions of the above information elements which occur some time later than the time at which a display command is issued, in a specific environment wherein such a delayed display is convenient for some reason relating to the function of the machine tool with which the numerical control system is employed.

Although the foregoing description was presented referring to a specific embodiment, this is not meant to be construed in a limiting sense. Various modifications of the disclosed embodiment, as well as other embodiments of this invention, will be apparent to persons skilled in the art upon reference to the description of this invention. It is therefore contemplated that the appended claims will cover any such modifications or embodiments which fall within the true scope of this invention.

What is claimed is:

1. A numerical control system for displaying information elements, comprising:
    input-output means including:
        means for inputting address numbers of a plurality of information elements to be displayed;
        means for inputting a time scale for a graphic display;
        means for inputting an address number of a display trigger information element;
        means for inputting a command for selection of either a set of repetitive pictures or a non-repetitive picture; and
        means for inputting a delay time; processing means including:
        means for selecting the address numbers of the plurality of information elements to be displayed;
        means for selecting the time scale for the graphic display;
        means for selecting the address number of the display trigger information element;
        means for conducting the command for selection of either a set of repetitive pictures or a non-repetitive picture; and
        means for inputting the delay time; and
    display means including:
        a first area for displaying the address numbers of the information elements to be displayed;
        a second area for graphically displaying the sequential progress of each of the information elements to be displayed; and
        a third area for displaying the display conditions.

2. A numerical control system for displaying information elements, comprising:
    an input-output circuit having a plurality of inputs including:
        an address input for inputting address numbers of a plurality of information elements to be displayed;
        a time scale input for inputting a time scale for a graphic display;
        a trigger address input for inputting an address number of a display trigger information element;
        a command input for inputting a command for selection of either a set of repetitive pictures or a non-repetitive picture; and
        a delay time input for inputting a delay time;
    a processing unit, coupled to said input-output circuit, for receiving the inputs of said input-output circuit and for generating a display signal based on the address numbers of the plurality of information elements to be displayed, the time scale for the graphic display, the address number of the display trigger information element, the command for selection of either a set of repetitive pictures or a non-repetitive picture, and the delay time;
    a display, coupled to said processing unit, for receiving the display signal and for generating a display, said display including:
        a first area for displaying the address numbers of the information elements to be displayed;
        a second area for graphically displaying the sequential progress of each of the information elements to be displayed; and
        a third area for displaying the display conditions.

* * * * *